Aug. 4, 1925.
P. B. HALL
1,548,266
VEHICLE
Filed July 5, 1924    2 Sheets-Sheet 2
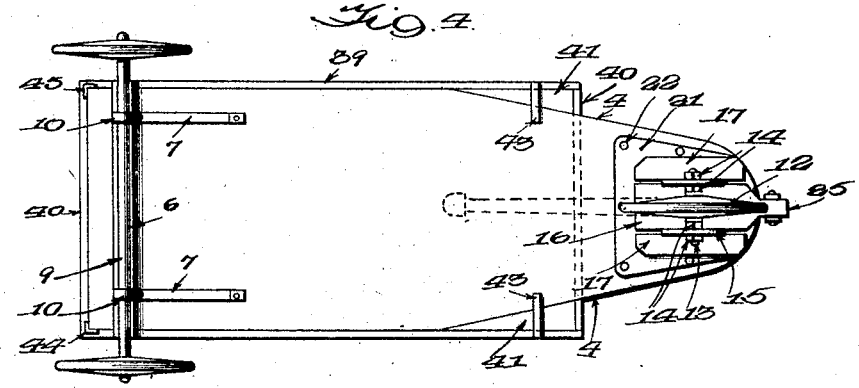
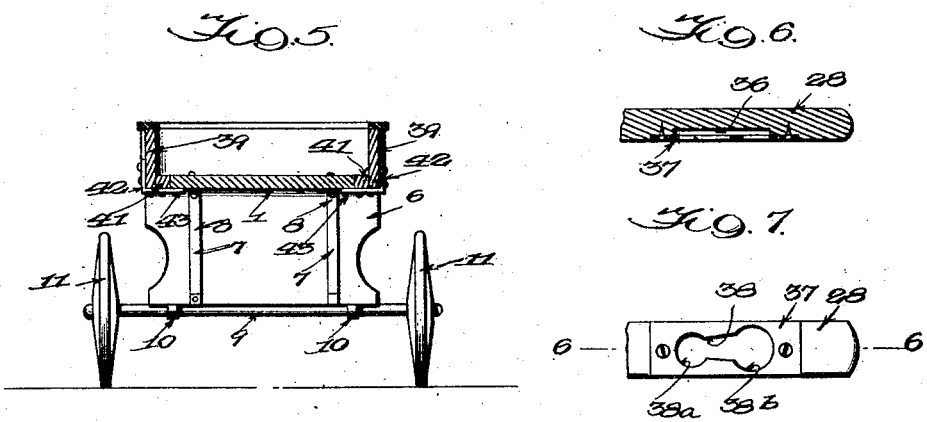
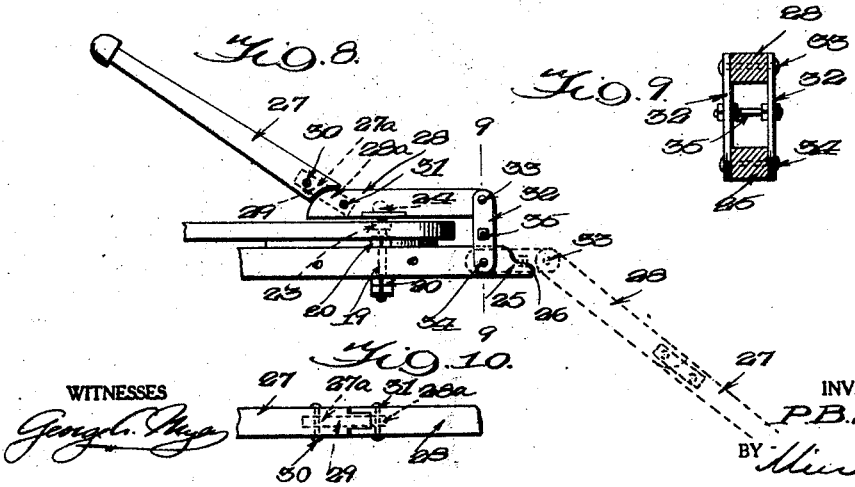
WITNESSES
INVENTOR
P. B. HALL,
BY
ATTORNEYS Patented Aug. 4, 1925.

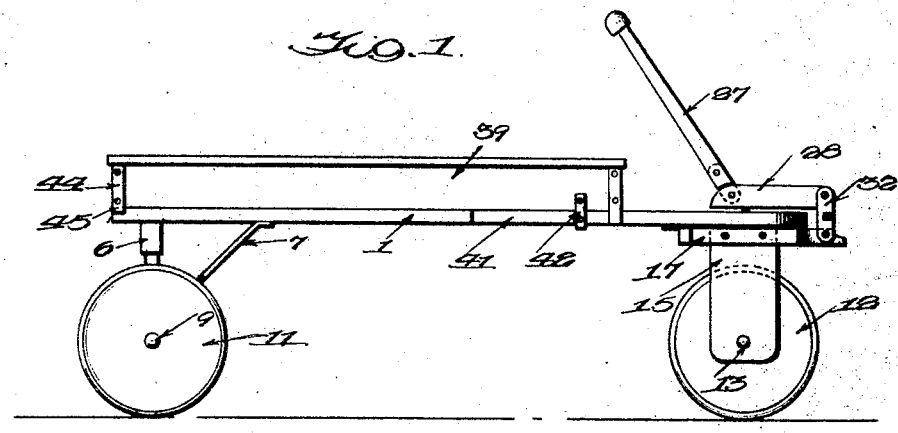
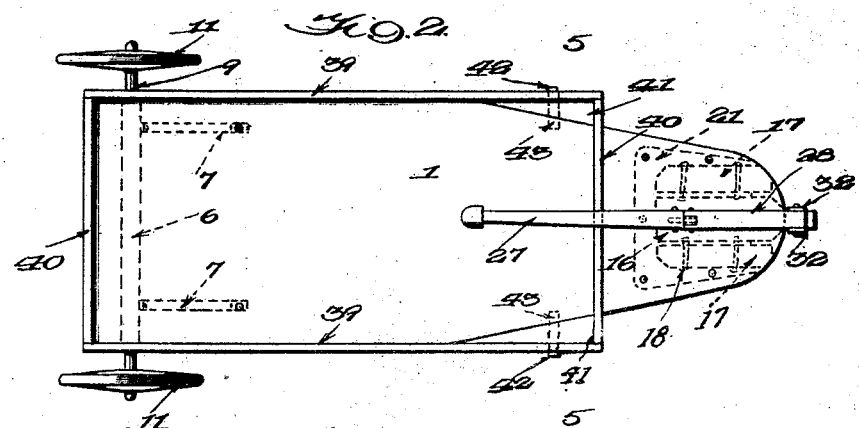
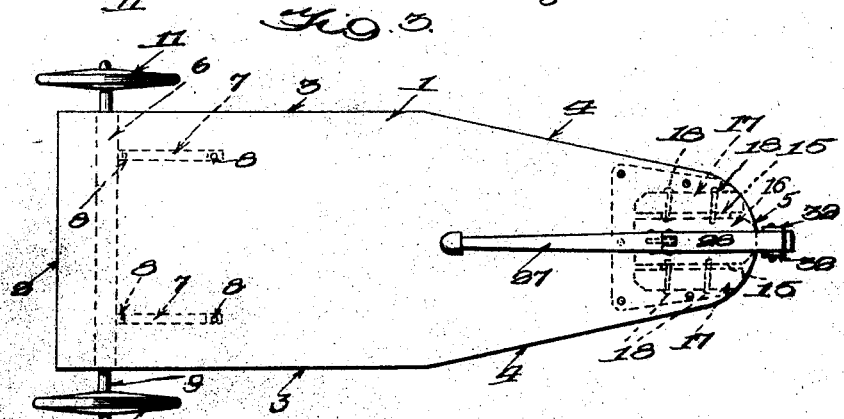

1,548,266

UNITED STATES PATENT OFFICE.

PORTER BISSELL HALL, OF CARRINGTON, NORTH DAKOTA.

VEHICLE.

Application filed July 5, 1924. Serial No. 724,390.

*To all whom it may concern:*

Be it known that I, PORTER B. HALL, a citizen of the United States, and resident of Carrington, in the county of Foster and State of North Dakota, have invented certain new and useful Improvements in Vehicles, of which the following is a specification.

This invention relates to improvements in vehicles for children, more particularly to a child's vehicle of that class to which coaster wagons belong, and it consists in the combinations, constructions and arrangements herein described and claimed.

An object of the invention is to improve the construction of a vehicle of the character described, which affords facilities for transmitting motion to the wheels of the vehicle and for the steering of the vehicle so that the improved vehicle can be pulled through the use of a pivoted handle bar when desired or the pivoted handle bar can be tilted rearwardly over the body of the vehicle and conveniently manipulated by the user of the vehicle to effect steering of the vehicle when the latter is used in coasting.

A still further object of the invention is to provide a vehicle of the character described having a single steering wheel attached to the body of the vehicle for bodily movement about a vertical axis together with a sectional handle bar which is attached to the means for attaching the steering wheel to the body of the vehicle and which is adapted to be maintained substantially rigid throughout its length when extended forwardly of the vehicle for use in pulling the latter and at the same time is adapted to be tilted rearwardly over the vehicle body for use in steering the vehicle during coasting, the handle and the means for attaching the steering wheel to the body having cooperative elements tending to prevent accidental turning of the steering wheel about the said vertical axis when the steering wheel comes in contact with a protuberance or like object on the surface which is traversed by the vehicle.

A still further object of the invention is to provide a vehicle having a novel arrangement of cooperative box and body members together with cooperative means carried by the box and the body member whereby the box can be detachably secured in place on the body member or dismounted from the body member as desired to vary the carrying capacity of the vehicle or for adapting the vehicle for use for any one of a plurality of purposes.

Figure 1 is a side elevation of the improved vehicle,

Figure 2 is a plan view of the vehicle.

Figure 3 is a plan view of the vehicle with the wagon box omitted,

Figure 4 is a bottom plan view of the vehicle,

Figure 5 is a transverse vertical section, the view being taken substantially along the line 5—5 of Figure 2, Figure 6 is a longitudinal vertical section through a portion of the handle bars, the view being taken substantially along the line 6—6 of Figure 7.

Figure 7 is a bottom plan view of the structure shown in Figure 6,

Figure 8 is a fragmentary side elevation showing the front or steering bolster, the means for pivotally attaching the steering bolster to the body of the vehicle and the handle bar, the latter being shown in full lines tilted rearwardly on the body of the vehicle for coasting and in dotted lines extended forwardly of the body of the vehicle, Figure 9 is a section along the line 9—9 of Figure 8, Figure 10 is a fragmentary plan view showing the meeting ends of sections of the handle bar.

A vehicle embodying the invention comprises a body 1 which may be a flat plate having the side edges thereof extending in parallel relation from their juncture with the rear edge 2 of the body for the greater part of their length as indicated at 3 and then converging for the remainder of their length as indicated at 4 and being merged at their forward ends into a rounded or arcuately curved front edge 5. A rear bolster 6 extends transversely of the body 1 adjacent to the rearward end of the latter and is secured to the body in any suitable known manner as through the use of the brackets 7 and screws 8, the brackets 7 also serving to stay the rear bolster to the body. A rear axle 9 is secured to the bolster 6 at the lower end of the latter by straps 10 and extends laterally of opposite ends of the bolster 6. Wheels 11 are mounted on the extending end portions of the axles 9 for rotation about the axis of the rear axle.

The body 1 is supported adjacent to its forward end upon a single steering wheel 12.

The steering wheel 12 is mounted upon a front axle 13 which has the end portions thereof secured, as by means of clamping nuts 14 in horizontally aligned openings in the lower portions of the pendant parallel arms 15 of a frame which is of substantially inverted U-shape. This frame comprises a web portion or front bolster which is made up of an intermediate section 16 and a pair of side sections 17 which respectively are disposed at opposite sides of the intermediate section 16 and clamp the upper end portions of the arms 15 against the lateral faces of the intermediate section, the lateral sections of the front bolster and the upper end portions of the arms 15 being secured together to move as a unit by suitable fastening devices, such as screws 18.

The intermediate section of the front bolster is provided at its center with a vertical opening through which a king bolt 19 extends, the king bolt being held against axial movement in respect to the front bolster by suitable devices such as nuts 20. A bearing plate 21 is secured to the body 1 against the under side of the forward end portion thereof by screws 22 and has a central opening in alignment with a central vertical opening through the forward end portion of the body. The king bolt 19 also extends through the aligned openings of the bearing plate 21 and of the forward end portion of the body and is held against axial movement in respect to the vertical opening through the forward end portion of the body by the upper nut 20 and a nut 23 which engages the king bolt and is received in a counterbore in the upper face of the forward end portion of the body. The king bolt extends above the plane of the upper face of the body and has the upper end portion thereof enlarged and rounded as indicated at 24.

With the arrangement just described, the wheel 12 will be mounted for rotation about the axis of the front axle 13 and also will be mounted for bodily turning movement about the axis of the king bolt 19, whereby the vehicle can be steered on a supporting surface.

The intermediate section 16 of the front bolster has the forward end portion thereof reduced in width and arranged to extend beyond the forward edge of the vehicle body as indicated at 25. The lower face of each forward portion 25 preferably is flush with the lower face of the remainder of the section 16 but the upper face of the portion 25 is offset downwardly adjacent to its forward end to provide a horizontal shoulder 26. The handle comprises a relatively long rigid end section 27 and a shorter rigid section 28. The meeting ends of the sections 27 and 28 have axial recesses therein as indicated at 27$^a$ and 28$^a$ respectively for the reception of the end portions of a rigid connecting link 29. One end portion of the connecting link 29 is held against displacement from position in the recess 27$^a$ by a fastening element 30 and a transverse pivot element 31 holds the other end portion of the link 29 against axial movement in the recess 28$^a$. It will be observed by referring to Figure 10 that the recess 28$^a$ is open at the normally underside of the section 28. It also will be seen by referring to Figure 8 that the meeting ends of the sections 27 and 28 are complementarily curved so that the section 27 may swing about the axis of the pivot member 31 in one direction from axial alignment with the section 28 but will be held because of the contact of the meeting ends of the sections 27 and 28 with each other and the contact of the link 29 with the bottom wall of the recess 28$^a$ from swinging in the opposite direction about the axis of the pivot element 31 from axial alignment with the section 28.

A pair of flat links 32 are disposed in straddling relation to the reduced portion 25 of the intermediate section 16 of the front bolster and the adjacent end portion of the section 28 of the handle bar. The links 32 are connected to the section 28 by a horizontal pivot element 33 and are pivotally connected to the reduced portion 25 of the front bolster by a horizontal pivot element 34 which is disposed rearwardly of the inner end of the shoulder 26.

A transverse stop member 35 which extends between the respective links 32 intermediate their ends is adapted to engage with the shoulder 26 when the links 32 have been swung downwardly from the full line position of Figure 8 to the plane of the intermediate section 16 of the front bolster as indicated by the dotted lines in Figure 8, whereby a pull on the handle bar will cause a straight forward movement of the vehicle.

The section 28 of the handle is provided in the face thereof that is uppermost when the handle is extended at the front of the body of the vehicle with a recess 36 which is covered by a plate 37 having a key hole slot 38 therein. The key hole slot 38 extends longitudinally of the plate 37 and has enlarged portions 38$^a$ and 38$^b$ respectively at the opposite ends thereof, the walls of the enlarged portions being arcuately curved and the enlarged portion 38$^b$ being of greater area than the enlarged portion 38$^a$. The enlarged portion 38$^b$ of the key hole slot is proximate to the end of the section 28 which is connected to the links 32 and is of sufficient area to permit the enlarged head 24 of the king bolt to be projected therethrough into the recess 36. The enlarged portion 38$^a$ is of less area than the cross sectional area of the enlarged portion 24 of the king bolt but is of greater area than the cross sectional area of the shank of the king bolt adjacent to the enlarged portion 24, whereby the handle can be swung laterally in either of opposite directions about the axis of the king bolt but will be held against upward movement in respect to the king bolt when the enlarged head 24 of the latter has been moved along the slot 38 until disposed within the recess 36 inwardly from the enlarged portion 38ª of the slot.

From the foregoing description of the various parts of the device, the operation thereof may be readily understood. The vehicle can be drawn conveniently and easily when the handle has been swung from the full line position of Figure 8 toward the dotted line position of the same figure. When the handle is in the dotted line position of Figure 8, the sections 27 and 28 will remain in axial alignment and will constitute what in effect will be a rigid handle so long as the pull on the outer end of the section 27 is in a forward or slightly upward direction. When desired, the sections 27 and 28 may be swung rearwardly over the body of the vehicle toward the full line position of Figure 8, the section 28 then may be placed in engagement with the upper end portion of the king bolt and the outer or free end of the section 27 may be swung upwardly about the axis of the pivot element 31 until the section 27 is in position to be conveniently manipulated by a child who is supported on the body of the vehicle when the vehicle is used in coasting. Since the steering device which is included in the vehicle comprises but a single wheel which is located directly beneath the lower end of the king bolt and since the inner section of the handle is engaged with the upper end portion of the king bolt as well as being connected by means of the links 32 and the steering bolster with the lower end portion of the king bolt, it will be manifest that the vehicle is not likely to swerve or to be turned from the direction in which it is being steered because of the action on the steering wheel of any obstruction which is encountered by the steering wheel during the passage of the vehicle over a supporting surface.

Also, it will be obvious that the vehicle can be easily and accurately steered when the vehicle is used for coasting and the handle is in the position best seen in Figure 8 since the handle then will serve as a lever and the axis about which the lever will be swung in steering the vehicle, namely the axis of the king bolt 19 will be located nearer to the user of the vehicle than is the case in coaster vehicles provided prior to my invention of which I am aware.

When it is desired to use the vehicle for transporting articles which probably would not remain on the flat body 1 during the movement of the vehicle on a supporting surface, the capacity of the vehicle for carrying articles may be enlarged by placing a frame or wagon box thereon. The frame or wagon box is substantially rectangular in horizontal sectional contour and comprises a pair of side members 39 connected together and held in spaced parallel relation by a pair of end members 40. The width of the wagon box is approximately the same as that of the wider portion of the body 1 and the length of the wagon box is slightly greater than the length of the wider portion of the body 1. Spacing members 41 having a thickness the same as that of the body 1 are provided at the inner forward corners of the wagon box to fill the spaces between the portions of the side walls of the tapering portion of the body 1 which are overlapped by the forward end portions of the side members 39 of the wagon box when the latter is disposed upon the body in the position shown in Figures 1, 2, 4 and 5. The spacing members 41 are stayed to the side members 39 by angle braces 42 which have arms extending transversely of the wagon box beyond the inner edges of the spacing members 41 as indicated at 43 to underlie and engage with the marginal edge portion of the body 1, the spacing members 41 and the tapering portion of the body having the adjacent edges thereof complementarily beveled to closely contact each other along the entire length of the inner edge of each spacing member. The wagon box also is provided at the rearward corners thereof with vertical locking members which are angular in horizontal sectional contour and which depend below the plane of the lower end of the wagon box as indicated at 45 in Figure 1. With the arrangement just described, it will be manifest that the wagon box will be held securely, although releasably, against displacement from the body 1 when the wagon box has been moved rearwardly upon the body 1 until the projections 43 are in engagement with the under side of the tapering portion of the body, the inner edges of the spacing members 41 are in close abutting relation to the lateral edges of the tapering portion of the body 1 adjacent to the juncture of the latter with the relatively wide portion of the body 1 and the rearward end portion of the wagon box has been moved downward until the pendant locking projections 45 embrace the rear corner portions of the body 1. In order to dismount the wagon box from the body 1, it only is necessary to lift the rearward end of the wagon box until the projections 45 disengage the body 1 and to then shove the wagon box forward until the horizontal projections 43 disengage the under face of the body 1. The wagon box will not interfere in any way with the use of the handle for steering the vehicle during coasting and can be kept on the body 1 permanently, if desired.

I claim:—

1. In a vehicle, a body, a bolster, a king bolt pivotally attaching the bolster to the body adjacent to the forward end and intermediate the width of the latter, a pair of vertical arms depending from said bolster and respectively disposed in planes lateral of and equi-distant from the axial line of the king bolt, a steering wheel supported between said arms for rotation about a horizontal axis, said bolster having a portion reduced in width extending forwardly of the front end of the body, and a handle attached to the reduced end portion of said bolster and comprising a plurality of rigid sections pivotally connected together in a longitudinal series, adjacent sections having relative swinging movement about horizontal axes, said king bolt extending at its upper end above the plane of said body to provide a fulcrum for said handle when the latter is in position to extend rearwardly upon said body beyond the front end of the latter, the upper end portion of said king bolt being enlarged and rounded, and a section of said handle having a cavity for the reception of said enlarged upper end portion of the king bolt when the handle is in said rearwardly swung position, and means on said one section of the handle releasably engageable with the enlarged upper end portion of the king bolt to hold the latter against displacement from said cavity while permitting lateral swinging movement of the handle about the axis of said king bolt.

2. In a vehicle of the character described, a flat plate like body supported on wheels, said body tapering in width at its forward end, a substantially rectangular frame adapted to be superimposed upon said body, said frame being of greater width at its forward end than the body, spacing members extending inwardly from the forward end portions of the side members of the frame for engaging with the side walls of the tapering portion of the body when said frame is in a certain position on the body, a pair of latching members extending on the under faces of said spacing members beyond the inner edges of the latter and a pair of other latching members secured on said frame at its rearward end to depend below the plane of the lower end of the frame, all of said latching members being adapted to engage with said body when the frame is in said certain position on the body to hold the frame against accidental displacement from the body.

PORTER BISSELL HALL.